Figure 1:
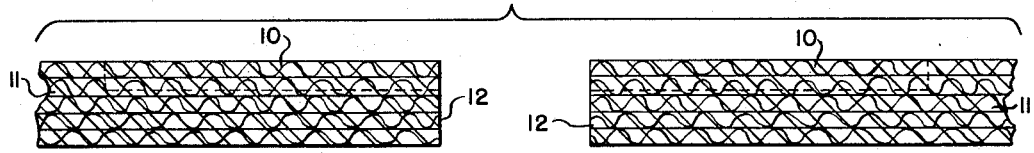

July 7, 1959  H. J. DE WINDT  2,893,007
COVERED HINGE JOINT FOR CONVEYOR BELTS
Filed Aug. 17, 1955

INVENTOR
Herbert John De Windt
BY
ATTORNEYS

United States Patent Office 2,893,007
Patented July 7, 1959

2,893,007

COVERED HINGE JOINT FOR CONVEYOR BELTS

Herbert John De Windt, Grand Rapids, Mich., assignor to Ton-Tex Corporation, Grand Rapids, Mich., a corporation of Michigan Application August 17, 1955, Serial No. 528,864

2 Claims. (Cl. 1—66)

This invention relates to conveyor belts and, more particularly, to a covered hinge joint for this type of belt.

Conveyor belts are used extensively for moving material from one position to another, the moving distance generally being determined by the layout of the plant or operation in which the belt is used. As a result, conveyor belts are more frequently made to specifications than to stock sizes. For optimum fit, therefore, it is common practice to join the ends of the belt "on the job," using lacing or metal clips for this purpose.

The most serviceable type of joining, however, is a true hinge joint because it readily accommodates itself to the curvature of the belt as the belt rounds a supporting wheel or pulley. It is a long recognized problem, however, that hinge joints in belts used to convey granular or pulverulent material promptly become clogged with this material. A hinge joint clogged with an abrasive material is rapidly worn and must be replaced at frequent intervals. Metal connectors are used predominantly in joining the ends of conveyor belts used to carry relatively heavy products such as sheet metal, gypsum board, and the like, but these connectors tend to scratch or mar the surface of the carried products. Consequently, many attempts have been made heretofore to develop a cover for the hinge joint which will not detract from the inherent flexibility of the hinge yet will offer complete coverage of and protection for the hinge in its working path. Thus, a variety of arrangements of flaps secured to one end of the belt adjacent the joint have been proposed and used, but the fact that one end of such flaps is free permits granular material to work into the joint and permits sheet material to catch under the flap.

I have now devised a novel covered hinge joint for a conveyor belt which is wholly effective in covering and protecting the joint, and my method of forming this covered joint lends itself to being carried out "on the job" while nevertheless insuring a perfect fit. The covered joint of my invention is adapted to interconnect the adjacent ends of a conveyor belt of substantial thickness. A surface portion of each belt end is removed to form an end section of reduced thickness. Hinge knuckles are connected to the extremities of the reduced-thickness end sections of the belt, and a hinge pin interconnects the hinge knuckles. A cover portion is secured in fixed position on each reduced-thickness end section, the thickness of each cover portion being such as to restore the overall thickness of its respective end section to the original thickness. The extremities of the cover sections firmly abut one another along a line parallel to and aligned with the hinge pin when the belt joint is in a flat plane.

My novel method of forming this covered hinge joint comprises removing a surface portion of a section of the belt at each end thereof so as to form end sections of substantially less thickness than the remainder of the belt, securing hinge knuckles to the terminal extremities of each of the reduced-thickness end sections, and interconnecting the hinge knuckles with a hinge pin. A single cover portion is then secured to the surface of the thus-joined reduced-thickness end sections, the thickness of the cover portion being such as to restore the end sections to substantially their original thickness. Thereafter, the cover portion is severed along a line parallel to and aligned with the hinge pin. When the hinge pin is then removed, the ends of the belt can be separated to install the belt, and when the hinge pin is replaced in the installed belt the two portions of the initially single portion cover will firmly abut along the line of severance.

Figure 2:
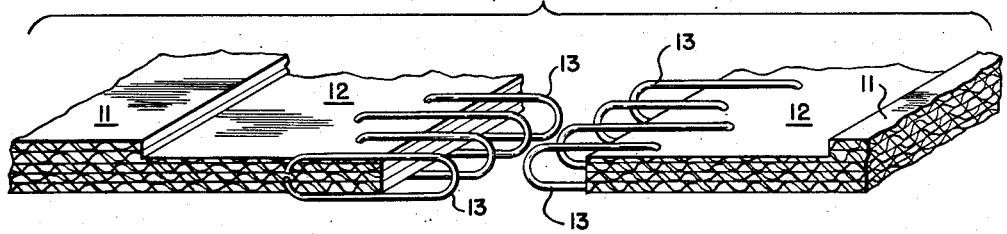
Figure 3:
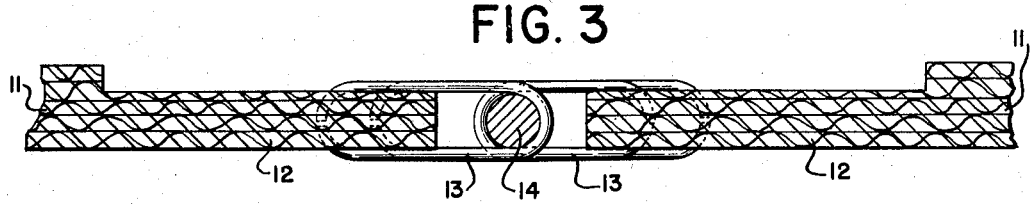
Figure 4:
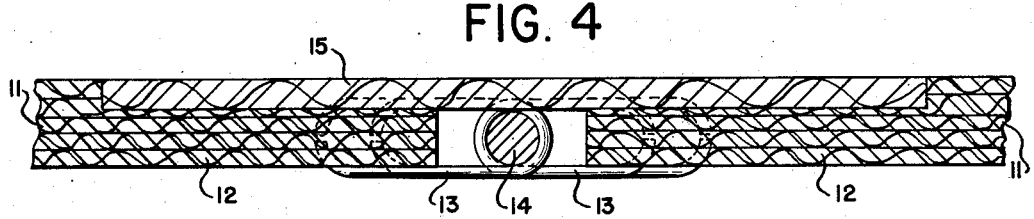
Figure 5:
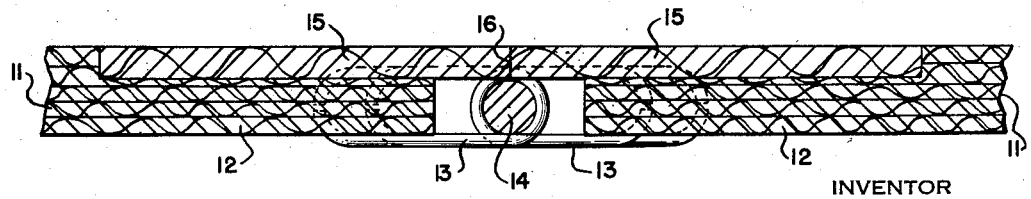

These and other novel features of my invention will be more readily understood by reference to the accompanying drawings in which Fig. 1 is a side elevation of the ends of a belt to be joined and showing the portion of each end which is removed pursuant to the invention;

Fig. 2 is a perspective view of the resulting end sections to which the hinge knuckles have been added; and Figs. 3, 4 and 5 are side elevations of the resulting belt structure in the following stages of the formation of the covered hinge joint pursuant to the invention, the completed hinge joint being shown in Fig. 5.

As shown in Fig. 1, the first step in forming my covered hinge joint is to remove a surface portion 10 (indicated by the dotted lines) from a section 11 of the conveyor belt at each end thereof after the belt has been cut to the desired length, due allowance being made in this length for the insertion of a conventional clip-type hinge between belt ends. In multi-ply conveyor belts of the type represented in the drawings and composed of a number of layers of cotton duck each impregnated with natural or synthetic rubber and then vulcanized into a multi-layer integral reinforced belt structure, the cut-away section may consist of two of the five or more plies of the belt structure 11. When the belt structure is composed partly of vulcanized plies of fabric with a relatively thick surface covering of natural or synthetic rubber, the cut-away portion may be either the rubber surface portion or this portion plus one of the underlying fabric plies. It must be understood, however, that the covered hinge joint structure of my invention is not limited to the two aforementioned belt structures but is applicable to any conveyor belt structure of sufficient thickness so that a surface portion of the belt may be removed while leaving a residual reduced-thickness section 12 of sufficient body to support a hinge joint connection.

The hinge joint is then formed, as shown in Fig. 2, by securing conventional belt hinge knuckles 13 to the reduced-thickness end sections 12. These knuckles advantageously consist of wire clips the ends of which are embedded in the terminal extremities of the belt end sections 12. The hinge knuckle clips 13 are so spaced along the terminal extremities of the end sections 12 that they can be interleaved, whereupon they are interconnected by insertion of a hinge pin 14 as shown in Fig. 3.

The resulting hinge joint is then provided with a cover pursuant to my invention by inserting a cover portion 15 into the recess formed by the adjoining reduced-thickness end sections 12. This cover portion is advantageously composed of a structure similar to that portion of the belt which has been removed and is cut to fit snugly into the aforementioned recess while the hinged ends of the belt are held flat. Both the recess and the under surface of the cover portion are thoroughly covered with rubber cement so that the cover portion will be firmly secured in position. I presently prefer, however, to use a vulcanizable rubber cement, whereupon, after the cover portion 15 has been positioned in the recess over the hinge joint, the entire covered hinge may be heated and compressed to vulcanize the cover portion-end section junctions. A portable vulcanizing unit can be used for this purpose so that the covered joint can be completed at the installation site. Then, as shown in Fig. 5, the cover portion 15 is severed with a sharp cutting blade which cuts through the cover portion along a line 16 parallel to and preferably aligned with the hinge pin 14. Thus, when the hinge pin 14 is removed, the ends of the belt may be separated to permit installation of the belt. When the ends of the installed belt are again joined so that the hinge knuckles 13 mate, the hinge pin 14 is simply inserted and the hinge joint is complete.

It will be appreciated that in the covered hinge joint of my invention, the terminal edges of the two sections of the cover portion 15 along the cut line 16 are in firm abutment while the ends of the belt lie in a flat plane, as is the case while the hinged portion travels through the work-conveying path. Thus, the hinge joint is covered so that it will not mark or injure the product being carried by the belt and even fine pulverulent material carried by the belt is excluded from the hinge joint by the cover structure of my invention, yet the cover is capable of accommodating the flexing of the hinge joint as it passes around the belt-supporting wheel or pulley at each end of the path of travel.

I claim:

1. The method of forming a covered hinge joint for adjacent ends of a conveyor belt which comprises removing a surface portion of one surface of a section of the belt at each end thereof so as to form residual end sections of substantially less thickness than the remainder of the belt, securing hinge knuckles to the terminal extremities of each of the reduced-thickness end sections, interconnecting the hinge knuckles with a hinge pin, securing to the surface of the thus joined reduced-thickness end sections a single cover portion of such thickness as to restore the end sections to substantially their original thickness, and thereafter severing the cover portion along a line parallel to and aligned with the hinge pin.

2. The method of forming a covered hinge joint for adjacent ends of a multi-ply conveyor belt which comprises removing at least one of the plies along one surface of a section of the belt at each end thereof so as to form residual end sections of substantially less thickness than the remainder of the belt, securing hinge knuckles to the terminal extremities of each of the reduced-thickness end sections, interconnecting the hinge knuckles with a hinge pin, securing to the surface of the thus joined reduced-thickness end sections a single cover portion of such thickness as to restore the end sections to substantially their original thickness, and thereafter cutting through the cover portion along a line parallel to and aligned with the hinge pin.

References Cited in the file of this patent

UNITED STATES PATENTS

| 1,948,411 | Asten | Feb. 20, 1934 |
| 2,084,490 | Hooper | June 22, 1937 |
| 2,488,872 | Mathieu | Nov. 22, 1949 |
| 2,516,779 | Lesesne | July 25, 1950 |